Jan. 18, 1966     J. C. HENZE ETAL     3,229,501
SQUARE CAVITY WHISTLE DETECTOR
Filed April 1, 1963     2 Sheets-Sheet 1

INVENTORS
J.C. HENZE
P.C. MC LEOD
BY *Young and Quigg*
ATTORNEYS

# United States Patent Office 3,229,501
Patented Jan. 18, 1966

3,229,501
SQUARE CAVITY WHISTLE DETECTOR
James C. Henze, Bartlesville, Okla., and Paul C. McLeod, Little Rock, Ark., assignors to Phillips Petroleum Company, a corporation of Delaware
Filed Apr. 1, 1963, Ser. No. 269,259
6 Claims. (Cl. 73—23.1)

This invention relates to an acoustical detector for the determination of the composition of a fluid. In one aspect it relates to a whistle which is sensitive to the composition of gases passing therethrough. In another aspect this invention relates to a whistle which produces a maximum volume of a desired acoustical signal with a minimum of interfering signals generated by the whistle.

Gas chromatography is a known method of analyzing fluid samples by preferential absorption and desorption. The desirability of using chromatography for such specific uses as fractionation (multistage distillation) control has been recognized for some time. Conventionally, as the segregated constituents of the fluid sample emerge from the sorption column, they are detected by sensing characteristic properties, such as thermal conductivity, density, refractive index, and the like, which identify the various components and measure the relative amounts of such components.

Recently there has been devised a wave-generating device or whistle wherein a gas passes through an orifice, over a perpendicular cavity and then over a sharp edge as more fully described in copending application Serial No. 121,491, now Pat. 3,144,762, by M. K. Testerman and P. C. McLeod. The whistle described and claimed in the above copending application provides a distinct advantage over the known methods of the prior art in that a reliable and sensitive signal can be generated at low gas flow rates so that gas analyses can be conducted quite rapidly.

We have now devised a whistle which provides a significant improvement over the whistles of the prior art including that of the above referred-to copending application in that the acoustical signal generated by the device of our invention is substantially free from stray frequencies generated by the device itself which must otherwise be filtered out from the signal produced. Broadly, the whistle of our invention comprises a rectangular passageway which serves as a straightening section for the flowing gases and which terminates in a rectangular orifice; and a quadrilateral resonant cavity having its opening adjacent the rectangular orifice and being disposed with respect to the passageway so that the included angle defined by the passageway and the resonant cavity is between about 105 and 150 degrees. The sharp edge of the open end of the cavity positioned across the cavity from the orifice serves as a jet edge for deflecting a portion of the flowing gas into the resonant cavity. In one embodiment of the invention the resonant cavity terminates in the same plane as that of the side of the orifice and passageway adjacent that cavity. In another modification of the invention the side of the resonant cavity across the mouth of the cavity from the orifice is raised to a plane parallel to, and between, the two planes occupied by the side of the orifice adjacent the resonant cavity and the opposite side of the orifice.

It is an object of this invention to provide a whistle which generates an acoustical signal composed principally of acoustical waves of a desired frequency and with a minimum of acoustical signal outside the desired frequency. It is also an object of this invention to provide a whistle which will generate an acoustical signal which is sensitive to changes in the composition of the gas passing through the whistle at low gas flow rates. A further object of this invention is to provide a whistle which requires a minimum of filtering out stray frequencies generated by the whistle. Still another object of this invention is to provide a whistle which embodies a very small working volume so as to be compatible with a high-speed chromatographic column. Other objects and advantages of this invention will be apparent to those skilled in the art upon study of this disclosure including the detail description of the invention and the appended drawing wherein:

FIGURE 3 is a cross-sectional elevation of the whistle of FIGURE 2 showing the relationship of the resonant cavity and the orifice; and FIGURE 4 is a cross-sectional elevation similar to that of FIGURE 3 illustrating a modification of the invention with respect to the relationship of the resonant cavity to the orifice.

Figure 1:
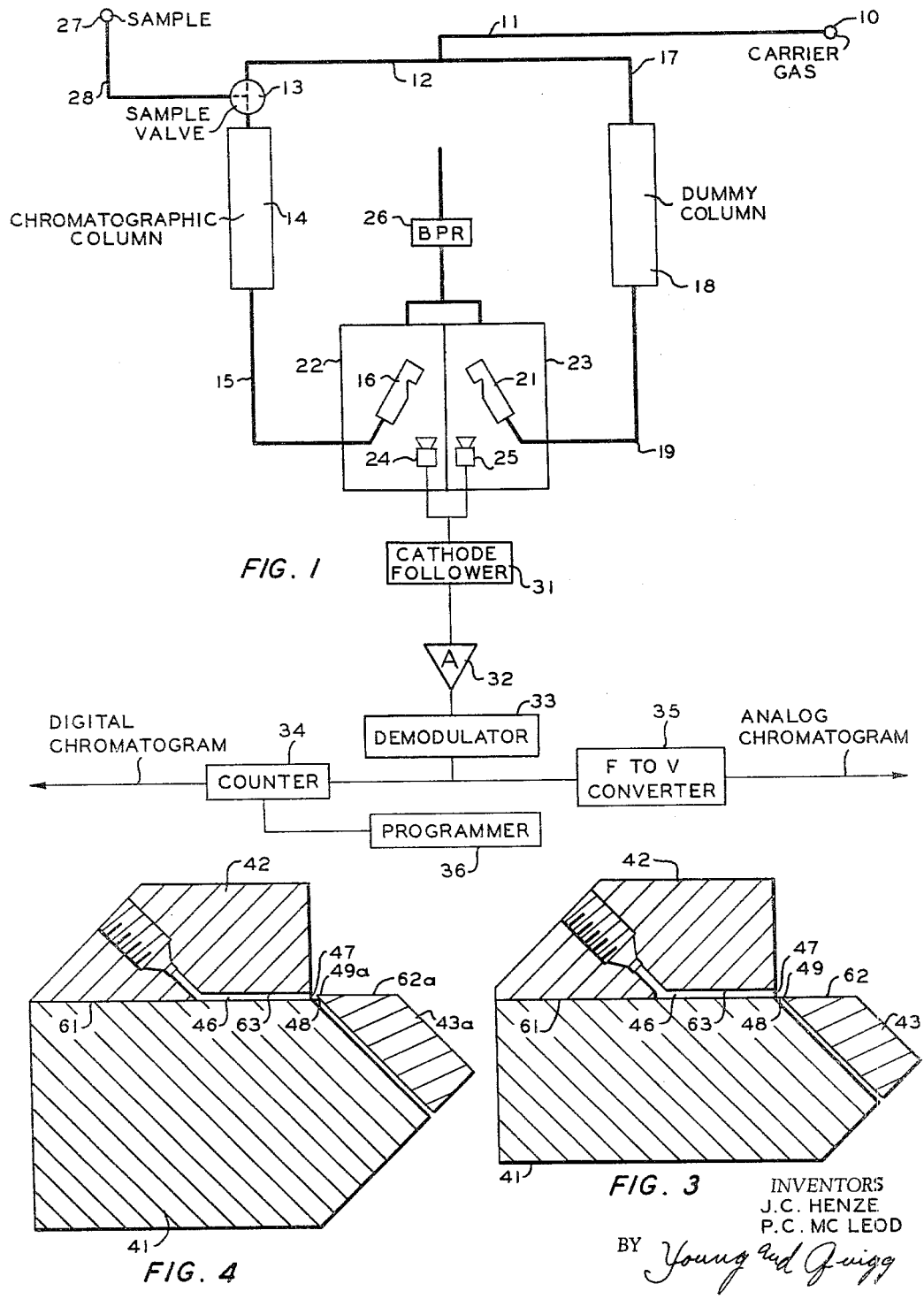
FIGURE 1 is a schematic diagram of a chromatographic analyzer utilizing the whistle detector of this invention.

Referring now to FIGURE 1, a carrier gas such as helium or hydrogen is passed from a source 10 via conduit 11, conduit 12, sample valve 13, chromatographic column 14 and conduit 15 to whistle 16. Carrier gas also flows via conduit 17, dummy column 18 and conduit 19 to whistle 21. The whistles 16 and 21 are each enclosed in a vapor-tight container or housing indicated at 22 and 23 along with microphones 24 and 25. The gas in the housings 22 and 23 is exhausted via pressure regulator 26.

Gas to be analyzed is passed in a measured quantity periodically from a source 27 via conduit 28 to sample valve 13 which admits the measured portion of gas into the stream in conduit 12. Suitable flow control devices (not shown) are incorporated to provide equal flow rates through the whistles 16 and 21 and their associated conduits. The dummy column 18 facilitates balancing the flow rates. The signal generated in microphone 24 is added to the signal generated in microphone 25 and the signal proportional to the sum of the signals is passed to cathode follower 31. The modulated signal is amplified at 32, demodulated at 33 and passed to counter 34 so as to produce a digital chromatogram or to frequency-to-voltage converter 35 so as to produce a digital chromatogram. The programmer 36 resets the counter 34 after each peak of the chromatogram.

The whistles 16 and 21 are tuned to the same frequency when carrier gas is passing therethrough so that when sample is passed through whistle 16 a beat frequency is introduced which is proportional to the concentration of the particular component of the gas sample in the gas flowing through whistle 16 at that instant. The modulated signal is amplified, the frequency described by the envelope of the modulated signal being the beat frequency. The demodulator produces this beat frequency for recording by the counter or the frequency-to-voltage converter. The frequency-to-voltage converter produces a higher voltage for the higher beat frequency thereby describing the conventional chromatographic peak which can be handled by conventional methods. The counter is its own integrating device and provides a digital representation of the area under the peak. This digital representation of the area under the peak is proportional to the concentration of the particular component of gas sample in the gas flowing through the whistle at the time measured. The operation of the chromatographic analyzer will be understood by those skilled in the art and need not be further discussed herein.

Figure 2:
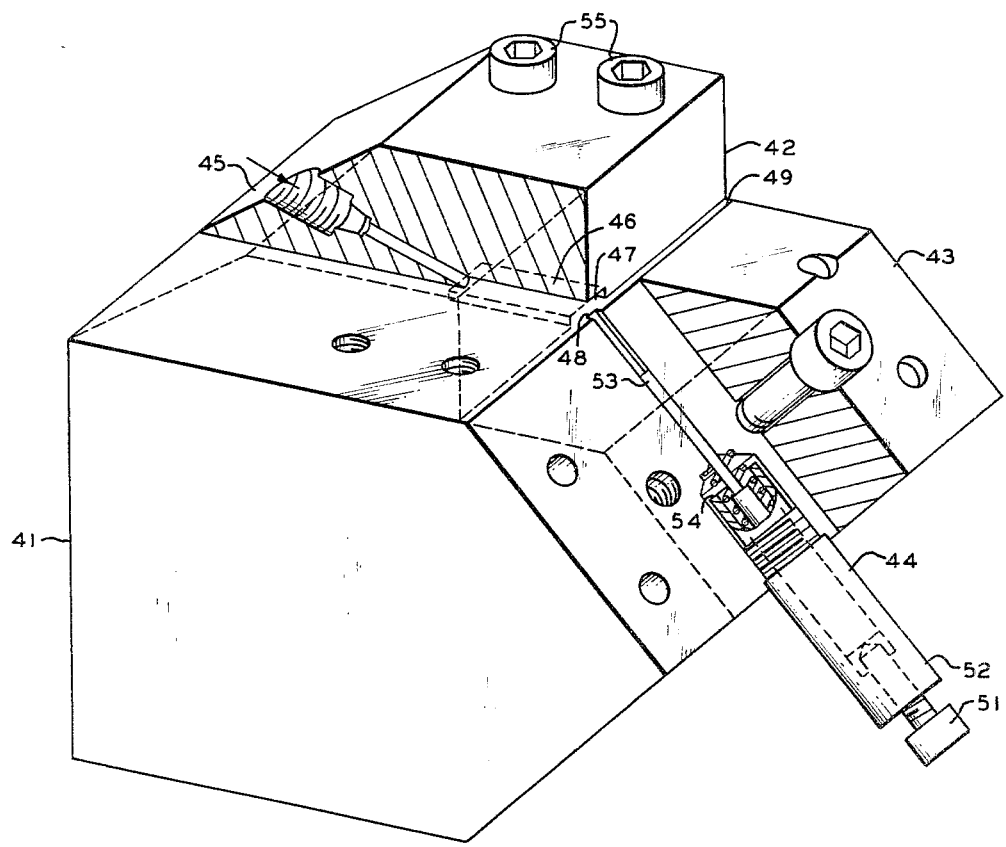
FIGURE 2 is a perspective view, partly in section, of a preferred embodiment of the invention.

The whistle of the invention is illustrated in FIGURE 2 and is composed of a cavity block 41, orifice passage block 42, cavity cap block 43 and cavity length adjuster 44. Gas is admitted to the inlet 45, passes through the orifice passage 46, out of orifice 47 and across the open end of cavity 48 so as to strike the opposite edge of the cavity 48, which edge comprises the edge 49 of the cavity cap block 43.

The length of the resonant cavity 48 is varied by turning the knurled knob 51 which is in threaded relationship with sleeve 52 so as to move square or rectangular pin 53 into or out of the cavity 48 against the compression spring 54. The blocks 41, 42 and 43 are secured together in proper relationship by threaded bolts such as that indicated at 55.

The relationship of the cavity block 41, orifice block 42 and cavity cap block 43 is shown in FIGURE 3. The surface 61 of cavity block 41 and the surface 62 of cavity cap block 43 are in the same plane.

A modification of the whistle is shown in FIGURE 4 wherein the cavity cap block 43a is positioned so that the surface 62a is in a plane between and parallel to those planes defined by the surface 61 of cavity block 41 and the surface 63 of the orifice passageway 46 of orifice block 42. The distance of the orifice 47 from the open end of the resonant cavity 48 can be varied by moving the orifice block 42 along the surface 61 of cavity block 41. This, in effect, moves the jet edge 49 or jet edge 49a toward or away from the orifice 47.

The cross-sectional dimensions of the orifice and passageway leading to the orifice will usually be the same so that the passageway acts as a straightening section to reduce the turbulence of the flowing gas.

The whistle illustrated in FIGURE 2 was fabricated to the following dimensions:

|  | Inches |
|---|---|
| Orifice height | 0.002 |
| Orifice width | 0.025 |
| Resonant cavity cross section | 0.020 x 0.020 |
| Resonant cavity length | 0.075 to 0.3 |
| Jet edge distance | 0.030 |
| Orifice passageway length | 0.5 |

In the above tabulation the orifice height is the distance from the side of the orifice adjacent the resonant cavity to the opposite side. The orifice passageway, and similarly the orifice, will have a width-to-height ratio greater than one, usually between 5 and 25. The jet edge distance is the distance from the orifice 47 to the opposite side or edge 49 of the resonant cavity 48. The resonant cavity in the above tabulation is square in cross-section; however, the cross-section of the resonant cavity can be any quadrilateral with the side opposite the orifice, i.e., edge 49, normal to the flow of gas from the orifice 47. A square or rectangular cross-section is preferred so as to minimize further the generation of frequencies other than the desired frequency and to facilitate fabrication.

The whistle of our invention provides a substantially turbulence-free flow of gas across a rectangular resonant cavity and against the straight edge of the cavity so that stray frequencies are substantially eliminated.

That which is claimed is:

1. A whistle comprising a body having an elongated rectangular orifice, said orifice having a cross-section with a width-to-height ratio greater than one; means to introduce a fluid to a first open end of said orifice; a sharp edge spaced from and adjacent a second open end of said orifice and parallel to the greater dimension of the cross-section of said orifice; said body having a quadrilateral resonant cavity, said cavity having a first open end adjacent the second open end of said rectangular orifice and disposed at an angle within the range of from about 120° to 150° with respect to the longitudinal dimension of said orifice; and means to close the second end of said cavity at various distances from the first open end of said cavity.

2. A whistle comprising a body having an elongated rectangular passageway, said passageway having an inlet means communicating with a first end and terminating in a rectangular orifice at the second end; said body having an elongated quadrilateral resonant cavity having an open end adjacent said orifice and disposed so that the angle included by the cavity and the passageway is between about 120° and about 150°; a movable cavity closure positioned in said cavity; and means to move said closure a measured amount in said cavity.

3. The whistle of claim 2 wherein the rectangular passageway has a cross-sectional width-to-height ratio greater than one.

4. The whistle of claim 2 wherein the orifice is about 0.025 inch x 0.002 inch and the resonant cavity is about 0.020 inch x 0.020 inch in cross-section and about 0.075 to 0.3 inch in length.

5. The whistle of claim 2 wherein the angle enclosed by the cavity and the passageway is about 135°.

6. In a chromatographic analyzer comprising
a chromatographic column,
a source of carrier fluid,
a source of sample fluid for analysis,
the combination therewith of
a pair of substantially identical whistles each of which comprises a body having a rectangular passageway having an inlet end and a rectangular outlet end comprising an orifice;
said body having an elongated resonant cavity, quadrilateral in cross-section disposed with an open end adjacent said orifice so that the included angle between said cavity and said passageway is between about 120° and about 150°;
a movable cavity closure positioned in said cavity;
means to move said closure in said cavity a measured amount;
means to admit carrier fluid to one whistle;
means to admit sample fluid to the other whistle; and
means to detect and measure the beat frequency produced by the two whistles.

References Cited by the Examiner
UNITED STATES PATENTS
394,243  12/1888  Briggs _____ 46—179

OTHER REFERENCES

Testerman et al. in Gas Chromatography 3rd International Symposium, 1961, Edited by Brenner et al., Academic Press, New York, 1962, pages 183–188.

Nyborg et al.: Acoustical Society of America Journal, vol. 24, No. 3, May 1952, pages 293 to 304 (pages 302 to 304 relied upon).

RICHARD C. QUEISSER, *Primary Examiner.*

ROBERT L. EVANS, *Examiner.*